United States Patent
Filloramo

(10) Patent No.: US 10,584,687 B2
(45) Date of Patent: Mar. 10, 2020

(54) GRAVITY AND BUOYANCY ENGINE

(71) Applicant: Christopher Michael Filloramo, Waldorf, MD (US)

(72) Inventor: Christopher Michael Filloramo, Waldorf, MD (US)

( * ) Notice: Subject to any disclaimer, the term of this patent is extended or adjusted under 35 U.S.C. 154(b) by 125 days.

(21) Appl. No.: 15/847,905

(22) Filed: Dec. 19, 2017

(65) Prior Publication Data

US 2019/0186472 A1 Jun. 20, 2019

(51) Int. Cl.
| | |
|---|---|
| *F03G 3/00* | (2006.01) |
| *F03B 17/04* | (2006.01) |
| *H02K 53/00* | (2006.01) |
| *H02K 7/18* | (2006.01) |
| *F03G 7/10* | (2006.01) |

(52) U.S. Cl.
CPC ............... *F03G 3/00* (2013.01); *F03B 17/04* (2013.01); *H02K 7/1853* (2013.01); *H02K 53/00* (2013.01); *F03G 7/10* (2013.01); *Y02E 10/20* (2013.01); *Y10S 74/09* (2013.01)

(58) Field of Classification Search
CPC .......... F03G 3/00; F03G 7/10; H02K 7/1853; H02K 53/00; F03B 17/04; Y10S 74/09
See application file for complete search history.

(56) References Cited

U.S. PATENT DOCUMENTS

| | | | | |
|---|---|---|---|---|
| 6,249,057 B1* | 6/2001 | Lehet | ............. | F03B 17/02 |
| | | | | 290/1 R |
| 7,134,283 B2* | 11/2006 | Villalobos | ............. | F03G 7/10 |
| | | | | 60/639 |
| 8,112,992 B2* | 2/2012 | Pirincci | ............. | H02K 53/00 |
| | | | | 60/495 |
| 8,171,729 B2* | 5/2012 | O'Briant | ............. | F03B 17/04 |
| | | | | 290/1 R |
| 8,756,932 B2* | 6/2014 | Pirincci | ............. | F03B 17/04 |
| | | | | 60/495 |
| 9,745,952 B2* | 8/2017 | Westmoreland | ......... | F03G 3/00 |
| 10,036,366 B1* | 7/2018 | Kury | ............. | F03B 17/02 |
| 2009/0252563 A1* | 10/2009 | Gillespie | ............. | F03B 17/04 |
| | | | | 406/106 |
| 2013/0168970 A1* | 7/2013 | Grossman | ............. | F03B 17/04 |
| | | | | 290/1 A |

* cited by examiner

*Primary Examiner* — Michael C Zarroli

(57) ABSTRACT

A gravity and buoyancy engine has a gravity chamber, an air lock chamber, a buoyancy chamber, an electricity producing device and a cylindrical buoyant object. The air lock chamber is in communication in between the gravity chamber and the buoyancy chamber. The gravity chamber is filled with air at normal pressure. The air lock chamber is filled with air at increased pressure. The buoyancy chamber is filled with fluid. The cylindrical buoyant object is used to move along the gravity chamber via gravity, along the air lock chamber via gravity and along the buoyancy chamber via buoyancy, such that the electricity producing device is able to generate electricity.

1 Claim, 4 Drawing Sheets

GRAVITY AND BUOYANCY ENGINE

FIELD OF THE INVENTION

The present invention generally relates to an engine. More specifically, the present invention relates to a gravity and buoyancy engine.

BACKGROUND OF THE INVENTION

The majority of electrical energy humans use pollute the environment through the creation of said electrical energy. Most electrical energy for distribution on power grids is created by burning coal, natural gas, other fuels and use of nuclear power plants. The coal, natural gas and other fuels pollute the environment during the creation of electrical energy. Nuclear power plants pollute the environment when errors, miscalculations and catastrophe's occur during the creation of electrical energy. There are currently renewable energy sources being used in the creation of electrical power but all have their limitations. Limitation include wind not moving, sun not shining and also battery limitations.

SUMMARY OF THE INVENTION

The purpose of the Gravity & Buoyancy Engine is to produce clean energy. Generating electricity from renewable energy rather than fossil fuels offers significant public health benefits.

The air and water pollution emitted by coal and natural gas plants is linked to breathing problems, neurological damage, heart attacks, and cancer. The Gravity & Buoyancy Engine is a simple process to create grid distributable electricity with very minimal disruption to our environment and it's economical. By using a heavy buoyant object, gravity and buoyancy as specified in this invention we can replace existing fossil fueled and nuclear power plants.

In this invention we use a cylindrical buoyant object such as a Douglas Fir log which has an approximate specific gravity of 0.5 which will ascend in water. A Douglas Fir log with a 2.5 foot diameter and a 15 foot length has an approximate weight of 2,503 lbs. Formulated recycled plastic can have the same measurements and specific gravity as the Douglas Fir and can also be used.

In this invention is a tandem dual link chain assembly which will support the cylindrical buoyant object from both ends and will rotate electricity alternators thus creating electricity while the buoyant objects descend by use of gravity. There are physical levers operated during this descending buoyant object which release other buoyant objects into the cycle to constantly energize the tandem dual link chain assembly into creating electricity with the electric alternators.

The buoyant objects follow a path of the tandem dual link chain assembly and roll on through a air lock chamber which has air tight doors that are opened and closed with each passing cylindrical buoyant object. This air lock chamber is how the cylindrical buoyant objects enter the fluid filled chamber at the bottom and float up under the influence of buoyancy. When the buoyant object nears the top it is redirected over top a hatch door and the buoyant object presses a lever releasing the hatch below the buoyant object then releasing the buoyant object with surrounding fluid downward by force of gravity onto the starting point to begin another cycle.

The invention can be built anywhere and has no need for sunlight, water or wind flow, nuclear energy or fossil fuels.

DETAIL DESCRIPTIONS OF THE INVENTION

While described herein are several embodiments of the present invention in sufficient detail so that any person of ordinary skill in the pertinent art, science, or area could construct and practice the invention, it should be understood that mechanical, structural, electrical, logical and operational changes may be made without departing from the spirit and or scope of the invention.

Figure 1:
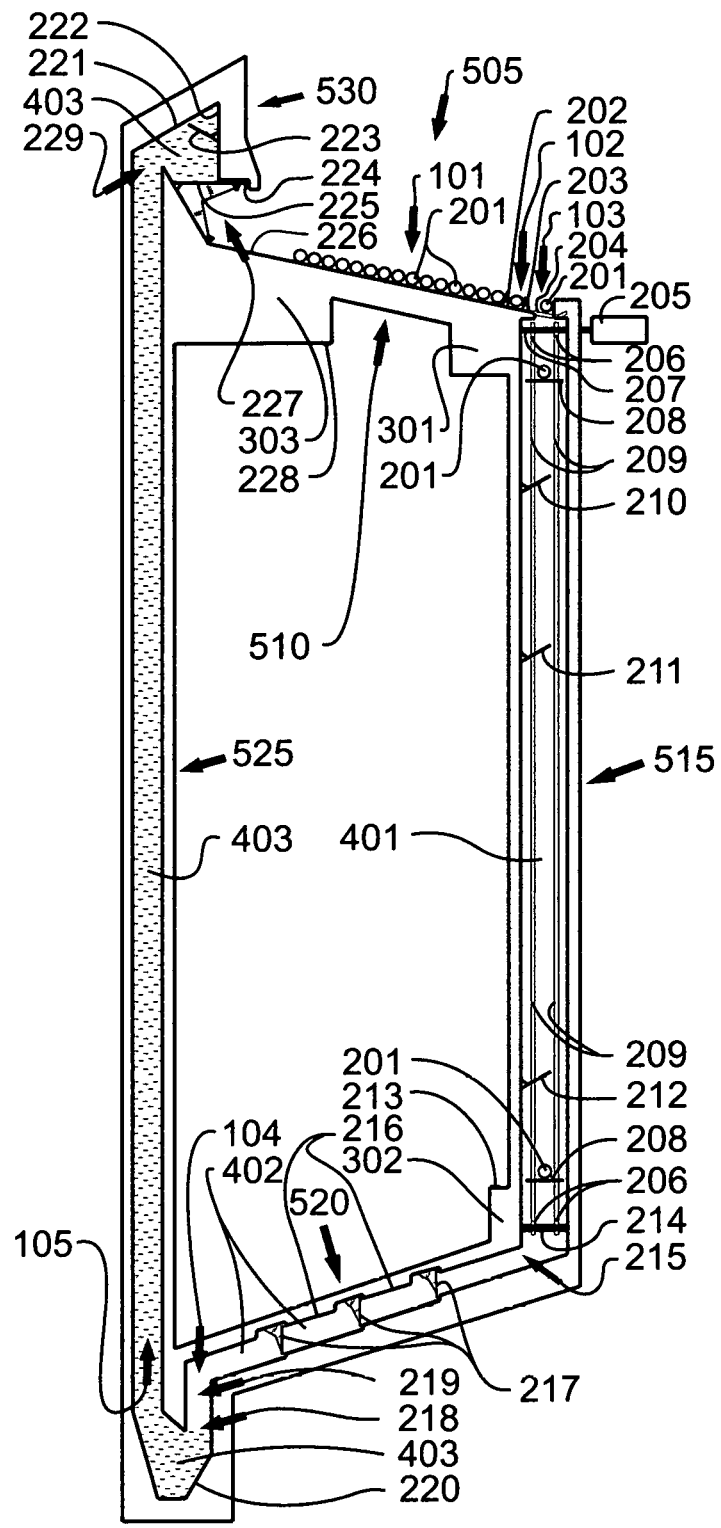
FIG. 1—Side elevation of the apparatus.

FIG. 1 illustrates a preferred embodiment of the invention, which is an apparatus (505) with an electricity producing device (205). The apparatus comprises a buoyant objects staging area (510), a gravity chamber (515), a airlock chamber (520), a buoyancy chamber (525), and, a buoyancy exit chamber (530), each of which is now further explained.

Figure 3:
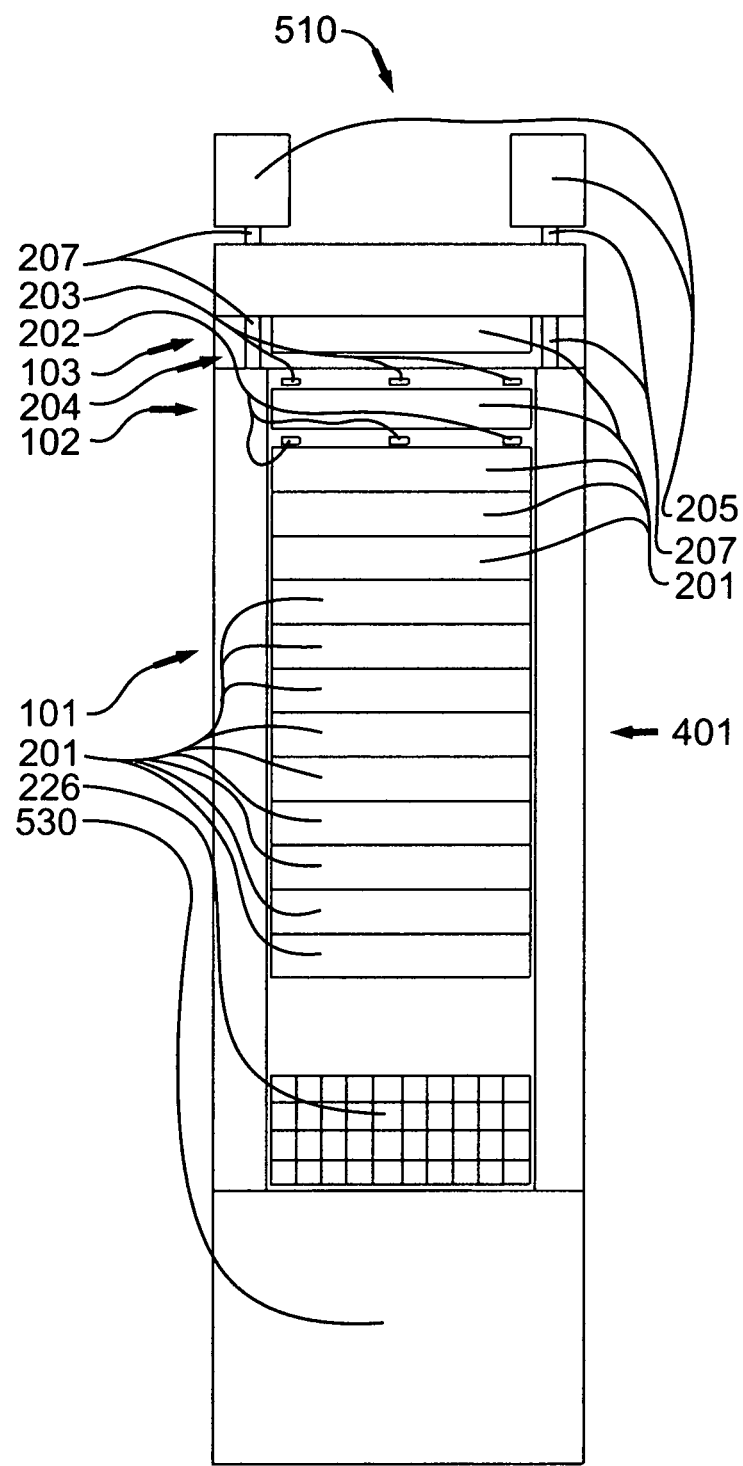
FIG. 3—Top view of apparatus.
Figure 4:
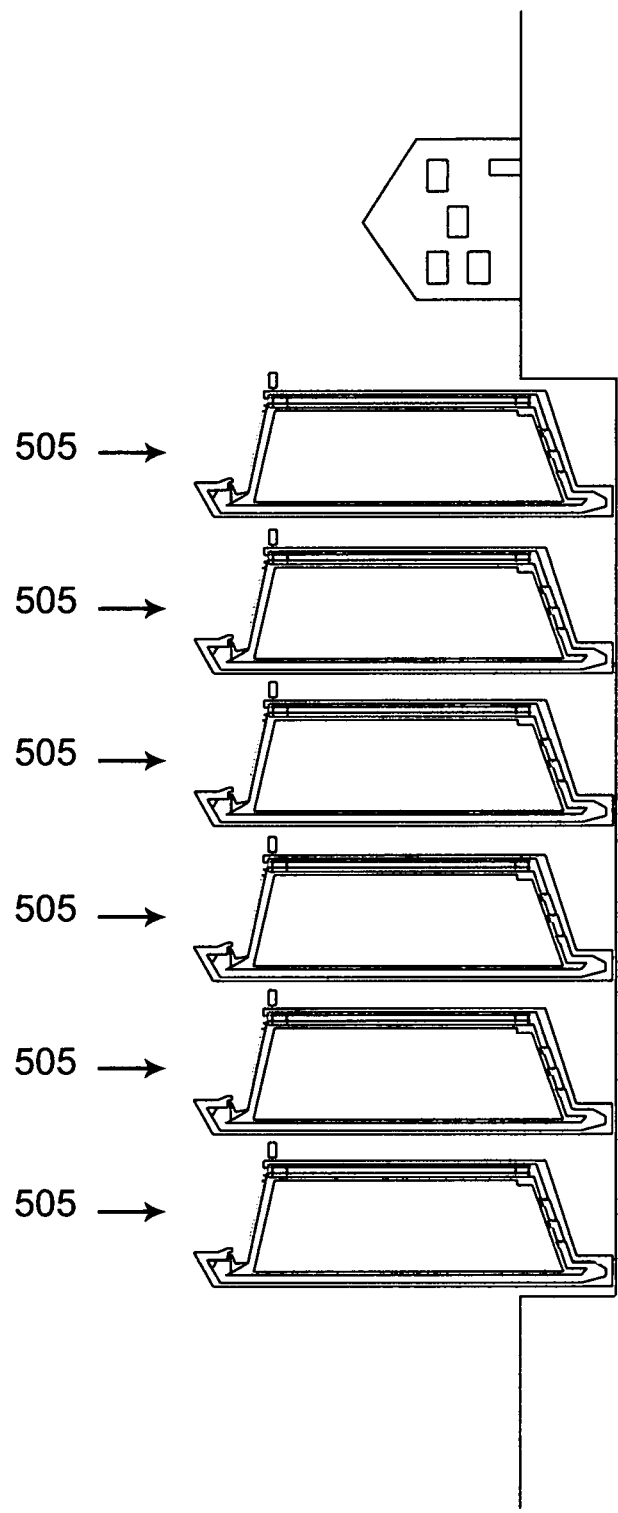
FIG. 4—Power plant design.

As illustrated in FIG. 1, FIG. 3, the apparatus (505) includes a buoyant objects staging area (510) at normal air pressure (401), for the staging of a plurality of cylindrical buoyant object/s (201) each being of cylindrical shape with a specific gravity less than the fluid (403) in the apparatus, comprising a fluid recovery area (226) to capture the fluid (403) released during the buoyant exit chamber (530) operation, secondary retractable pegs (202) to keep the plurality of cylindrical buoyant object/s (201) staged on the buoyant objects general staging area (101) separating an individual cylindrical buoyant object/s (201) in the buoyant object secondary staging area (102), a primary retractable pegs (202) to separate cylindrical buoyant object/s (201) to an individual cylindrical buoyant object/s (201) in the buoyant object primary staging area (103) to enter into the gravity chamber (515) through buoyant object entrance hatch (204).

As illustrated in FIG. 1, the apparatus (505) also included in the buoyant objects staging areas a fluid recovery reservoir (303), a mechanical fluid pump (301) to extract fluid (403) from fluid recovery reservoir (303) through fluid pump inlet (228) to return the fluid (403) to buoyancy exit chamber (530) through fluid pump outlet (222).

As illustrated in FIG. 1 the apparatus (505) next includes a gravity chamber (515) at normal air pressure (401) comprising a primary retractable pegs lever (210), a secondary retractable pegs lever (211), a buoyant objects entrance hatch lever (212), mechanical air pump (302), air pump inlet (213), and, tandem dual link chain conveyor assembly (506).

Figure 2:
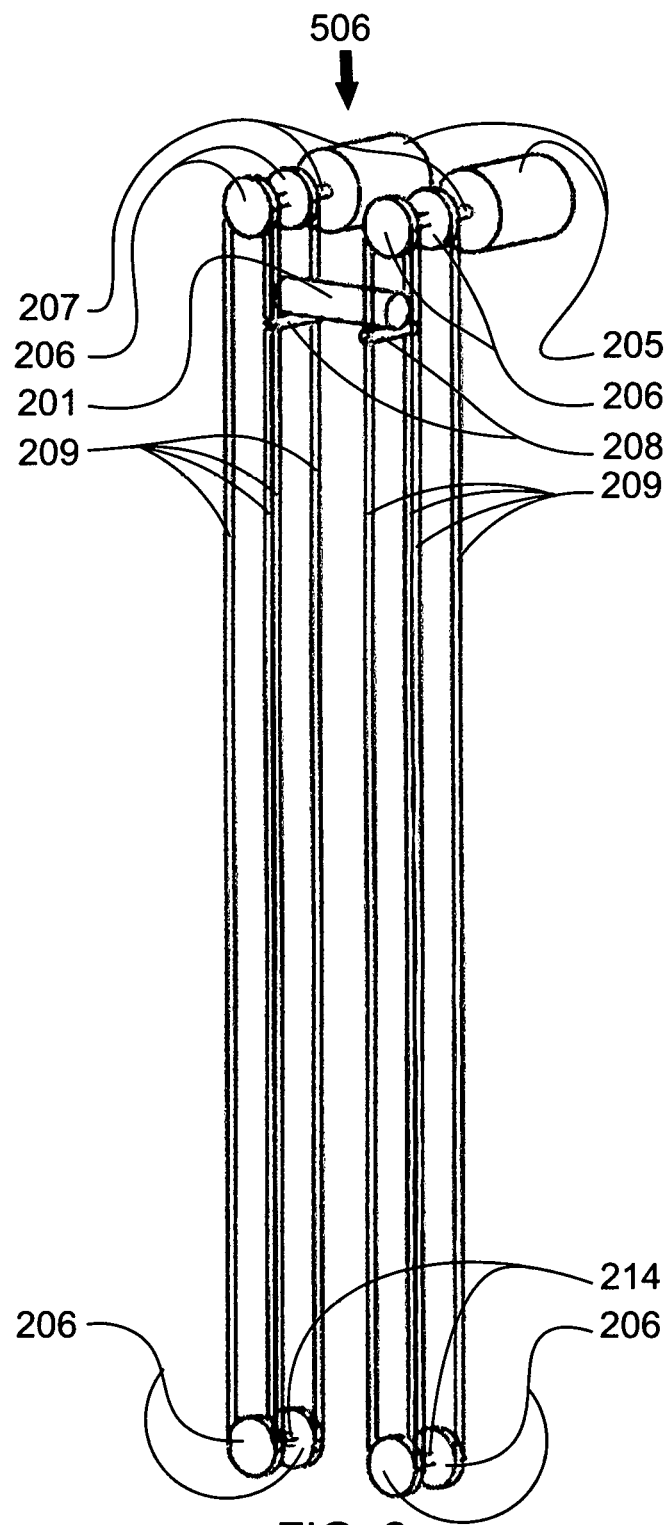
FIG. 2—Tandem dual link chain assembly.

As illustrated in FIG. 1, FIG. 2, the tandem dual link chain conveyor assembly (506) comprising a plurality of electricity producing devices (205) which has extruded from them a drive shaft (207) which has a plurality of gears (206), and have corresponding shaft (214) which has a plurality of gears (206) which are rotated together by movement of linked chain (209). A plurality of linked chain (209) are connected by buoyant object chain ledge (208). The cylindrical buoyant object/s (201) moves downward when released from the buoyant object primary staging area (103) through the buoyant object entrance hatch (204) by force of gravity when a different cylindrical buoyant object/s (201) passes and activates the buoyant objects entrance hatch lever (212) and then continues descent by force of gravity onto buoyant object chain ledge (208) and causes one directional movement of the link chain (209) and through attached gears (206) causes rotation of shafts shaft (214) and drive shaft (207) providing energy to electricity producing device (205).

As illustrated in FIG. 1, of apparatus (505), next includes an airlock chamber (520) comprising an airlock chamber entrance (215), a plurality of air tight doors (217), a plurality of air pump outlets (216), increased air pressure (402) to maintain fluid level (218) at the airlock chamber exit (219).

As illustrated in FIG. 1, of apparatus (505) next includes a buoyancy chamber (525) comprising fluid level (218), deflecting surface (220), descend side of buoyancy chamber (104), ascend side of buoyancy chamber (105), and, fluid (403).

As illustrated in FIG. 1, of apparatus (505) next includes a buoyancy chamber exit (530) comprising a buoyancy chamber exit entrance (229), fluid (403), deflecting surface (221), fluid pump outlet (222), mechanical fluid tight door latch lever (223), fluid tight door latch (224), fluid tight door (225), and, buoyancy chamber exit (227).

Using the embodiment illustrated in FIG. 1, cylindrical buoyant object/s (201) stage in the buoyant objects staging area (510) and enter the gravity chamber (515) through the buoyant object entrance hatch (204) from the buoyant object primary staging area (103) individually when buoyant objects entrance hatch lever (212) is moved by passing cylindrical buoyant object/s (201) within the gravity chamber (515). The cycle is started by manually releasing the first cylindrical buoyant object/s (201) from primary staging area (601) through the buoyant object entrance hatch (204) by moving the buoyant objects entrance hatch lever (212). The buoyant object entrance hatch (204) springs closed behind the buoyant object/s (201) after the cylindrical buoyant object/s (201) passes through and enters the gravity chamber (515). The first cylindrical buoyant object/s (201) lands on the buoyant object chain ledge (208) and the cylindrical buoyant object/s (201) continues to descend through the gravity chamber (515) influenced by gravity. The descending of the buoyant object forces the buoyant object chain ledge (208) downward and causes the tandem dual link chain conveyor (506) to rotate the shaft (214) and drive shaft (207). The drive shaft (207) which is extruded through the electricity producing devices (205) causes the electricity producing devices (205) the required force to create electricity.

During the descend of the first cylindrical buoyant object/s (201) in the gravity chamber (515) the cylindrical buoyant object/s (201) passes and actuates the primary retractable pegs lever (210) which retracts the primary retractable pegs (203) and allows a second cylindrical buoyant object/s (201) to move on to the top of buoyant object entrance hatch (204) and then the primary retractable pegs (203) springs back to original position. The first cylindrical buoyant object/s (201) continues its descend in the gravity chamber (515) passes and actuates the secondary retractable pegs lever (211) which retracts the secondary retractable pegs (202) allowing the plurality of cylindrical buoyant object/s (201) to roll downward and stop at the primary retractable pegs (203) and then the secondary retractable pegs (202) springs back to original position separating the plurality of cylindrical buoyant object/s (201) from the cylindrical buoyant object/s (201) in secondary staging area (602). The first cylindrical buoyant object/s (201) continues its descend in the gravity chamber (515) passes and actuates the buoyant objects entrance hatch lever (212) which opens the buoyant object entrance hatch (204) and the second cylindrical buoyant object/s (201) descends into the gravity chamber (515) the second cylindrical buoyant object/s (201) lands on the buoyant object chain ledge (208) and the second cylindrical buoyant object/s (201) continues to descend through the gravity chamber (515) influenced by gravity. The descending of the second cylindrical buoyant object/s (201) forces the buoyant object chain ledge (208) downward and causes the tandem dual link chain conveyor to rotate the shaft (214) and drive shaft (207). The drive shaft (207) which is extruded through the electricity producing devices (205) causes the electricity producing devices (205) the required force to create electricity.

The first buoyant object/s (201) falls from the buoyant object chain ledge (208) after passing shaft (214) and enters the airlock chamber entrance (215) influenced by gravity. The first cylindrical buoyant object/s (201) rolls through the airlock chamber (520) influenced by gravity and forces open the air tight doors (217) and each of the air tight doors (217) spring closed behind the first buoyant object/s (201) as air is being forced into the air lock chamber (520) through the air pump outlets (216) by the mechanical air pump (302) which maintains the fluid level (218) at the airlock chamber exit (219). During the operation of apparatus (505) the mechanical air pump (302) is in continues operation and powered mechanically by shaft (206) and is continuously moving air from air pump inlet (213) to the air lock chamber (520) through air pump outlets (216). The first cylindrical buoyant object/s (201) drops into the descend side of buoyancy chamber (104) and submerges into the fluid (403) and then strikes the bottom deflecting surface (220) and is deflected to the ascend side of the buoyancy chamber (105) and the first cylindrical buoyant object/s (201) ascends to the buoyancy chamber exit entrance (229) influenced by buoyancy.

During the descending of the second cylindrical buoyant object/s (201) in the gravity chamber (515) the second cylindrical buoyant object/s (201) passes and actuates the primary retractable pegs lever (210) which retracts the primary retractable pegs (203) and allows a third cylindrical buoyant object/s (201) to move on to the top of buoyant object entrance hatch (204) and then the primary retractable pegs (203) springs back to original position. The second cylindrical buoyant object/s (201) continues its descend in the gravity chamber (515) passes and actuates the secondary retractable pegs lever (211) which retracts the secondary retractable pegs (202) allowing the plurality of cylindrical buoyant object/s (201) to roll downward and stop at the primary retractable pegs (203) and then the secondary retractable pegs (202) springs back to original position separating the plurality of cylindrical buoyant object/s (201) from the fourth cylindrical buoyant object/s (201) in secondary staging area (602). The second cylindrical buoyant object/s (201) continues its descend in the gravity chamber (515) passes and actuates the buoyant objects entrance hatch lever (212) and the buoyant object entrance hatch (204) opens and the third cylindrical buoyant object/s (201) descends into the gravity chamber (515) the third cylindrical buoyant object/s (201) lands on the buoyant object chain ledge (208) and the third cylindrical buoyant object/s (201) continues descending through the gravity chamber (515) influenced by gravity. The descend of the third cylindrical buoyant object/s (201) forces the buoyant object chain ledge (208) downward and causes the tandem dual link chain conveyor to rotate the shaft (214) and drive shaft (207). The drive shaft (207) which is extruded through the electricity producing devices (205) causes the electricity producing devices (205) the required force to create electricity.

The first cylindrical buoyant object/s (201) ascends through the buoyancy chamber exit entrance (228), into the buoyancy exit chamber (530), and strikes the top deflecting surface (221) and is directed to the fluid tight door latch lever (223) and when the cylindrical buoyant object/s (201) moves the fluid tight door latch lever (223) the fluid tight door latch (224) retracts and the fluid tight door (225) is forced opened by weight of fluid (403) and cylindrical buoyant object/s (201). Fluid (403) and cylindrical buoyant object/s (201) descend through the buoyancy chamber exit (227) and cylindrical buoyant object/s (201) arrives back to the buoyant object staging area (510) at the buoyant object general staging area (101) while the fluid (403) descends onto the fluid recovery area (226) and is collected into the fluid recovery reservoir (303). The fluid tight door (225) springs closed behind the passing of fluid (401) and cylindrical buoyant object/s (201). During the operation of apparatus (505) the mechanical fluid pump (301) is in continues operation and powered mechanically by drive shaft (207) and is continuously moving fluid from fluid recovery reservoir (303) through fluid pump inlet (228) to buoyancy exit chamber (530) through fluid pump outlet (222) and preparing for the next cylindrical buoyant object/s (201) to move the fluid tight door latch lever (223).

I claim:

1. A gravity and buoyancy engine comprising:
a gravity chamber;
an air lock chamber;
a buoyancy chamber;
an electricity producing device;
a first shaft;
a first gear;
a second shaft;
a second gear;
a link chain;
a buoyant object chain ledge;
an air tight door;
a cylindrical buoyant object;
the air lock chamber being in communication in between the gravity chamber and the buoyancy chamber;
the gravity chamber being filled with air at normal pressure;
the air lock chamber being filled with air at increased pressure;
the buoyancy chamber being filled with fluid;
the first shaft being rotatably connected with the electricity producing device;
the first gear being connected with the first shaft;
the second gear being connected with the second shaft;
the link chain being rotatably connected in between the first gear and the second gear;
the buoyant object chain ledge being connected with the link chain;
the buoyant object chain ledge being mounted within the gravity chamber;
the air tight door being mounted within the air lock chamber;
the cylindrical buoyant object being configured to enter the gravity chamber and land on the buoyant object chain ledge via gravity after passing through the buoyancy chamber;
in response to the cylindrical buoyant object landing on the buoyant object chain ledge, the buoyant object chain ledge being forced to move downward by the cylindrical buoyant object;
in response to the buoyant object chain ledge moving downward, the link chain being rotated in between the first gear and the second gear so as to rotate the first shaft;
the electricity producing device being configured to generate electricity via rotation of the first shaft;
the cylindrical buoyant object being configured to enter the air lock chamber via gravity after passing through the gravity chamber and falling from the buoyant object chain ledge;
in response to the cylindrical buoyant object entering the air lock chamber, the cylindrical buoyant object rolling along the air lock chamber via gravity so as to open the air tight door;
in response to the cylindrical buoyant object passing through the air tight door, the air tight door being closed via spring force;
the cylindrical buoyant object being configured to enter the buoyancy chamber via gravity after passing through the air lock chamber; and
in response to the cylindrical buoyant object entering the buoyancy chamber, the cylindrical buoyant object ascending along the buoyancy chamber via buoyancy.

* * * * *